(12) United States Patent
Chen (10) Patent No.: US 9,163,432 B2
(45) Date of Patent: Oct. 20, 2015

(54) LOCKING APPARATUS FOR BICYCLE

(71) Applicant: GIANT MANUFACTURING CO., LTD., Taichung (TW)

(72) Inventor: Mu-Tsun Chen, Miaoli County (TW)

(73) Assignee: GIANT MANUFACTURING CO., LTD., Taichung (TW)

( * ) Notice: Subject to any disclaimer, the term of this patent is extended or adjusted under 35 U.S.C. 154(b) by 0 days.

(21) Appl. No.: 14/537,866

(22) Filed: Nov. 10, 2014

(65) Prior Publication Data

US 2015/0176312 A1 Jun. 25, 2015

(30) Foreign Application Priority Data

Dec. 25, 2013 (TW) .............................. 102224398 U (51) Int. Cl.
  *E05B 71/00* (2006.01)
(52) U.S. Cl.
  CPC ............. *E05B 71/00* (2013.01); *Y10T 70/5027* (2015.04); *Y10T 70/5872* (2015.04); *Y10T 70/5876* (2015.04); *Y10T 70/5881* (2015.04)
(58) Field of Classification Search
  CPC ....... E05B 71/00; E05B 67/365; E05B 67/36; B62H 5/001; B62H 5/00; B62H 5/005; B62H 3/00; B62H 2003/005; B62H 1/00; B62H 1/06; B62H 2700/00; B62H 2700/005; Y10T 70/5872; Y10T 70/5876; Y10T 70/5881; Y10T 70/5027
  USPC .......................... 70/34, 62, 233–235; 211/5; 248/551–553
  See application file for complete search history.

(56) References Cited

U.S. PATENT DOCUMENTS

| | | | | |
|---|---|---|---|---|
| 3,946,581 | A | * | 3/1976 | Weeks et al. ........................ 70/6 |
| 3,995,459 | A | * | 12/1976 | Weeks et al. ........................ 70/13 |
| 4,183,235 | A | * | 1/1980 | Coralli et al. ...................... 70/34 |
| 5,664,445 | A | * | 9/1997 | Chang ................................. 70/34 |
| 5,992,187 | A | * | 11/1999 | Derman ............................. 70/58 |
| 6,330,815 | B1 | * | 12/2001 | Duncan .............................. 70/58 |
| 7,631,525 | B1 | * | 12/2009 | Kennealy ......................... 70/227 |
| 8,151,604 | B2 | * | 4/2012 | Thomas et al. ................... 70/14 |
| 2002/0104338 | A1 | * | 8/2002 | Koy et al. .......................... 70/34 |
| 2003/0015007 | A1 | * | 1/2003 | Zapushek et al. ............... 70/386 |
| 2005/0022618 | A1 | * | 2/2005 | Irgens et al. ...................... 74/34 |
| 2007/0137266 | A1 | * | 6/2007 | Hsai ................................. 70/34 |

* cited by examiner

*Primary Examiner* — Lloyd Gall
(74) *Attorney, Agent, or Firm* — CKC & Partners Co., Ltd.

(57) ABSTRACT

A locking apparatus for a bicycle is provided. The locking apparatus is for locking with a public bicycle station and includes a body, a locking portion and a controlling portion. The body is connected to the bicycle. The locking portion is located on one side of the body and includes a rotating unit, a locking member and an ejecting member. The rotating unit includes a locking groove, wherein a locking head can be inserted into the locking groove, and the rotating unit is rotated between a first position and a second position. When the rotating unit is located at the first position, the ejecting member is corresponded to the locking member and is ejected from the locking groove. The controlling portion is located on the other side of the body and includes an operating unit rotatably coupled to the rotating unit.

10 Claims, 7 Drawing Sheets

LOCKING APPARATUS FOR BICYCLE

RELATED APPLICATIONS

The application claims priority to Taiwan Application Serial Number 102224398, filed on Dec. 25, 2013, which is herein incorporated by reference.

BACKGROUND

1. Technical Field

The present disclosure relates to a locking apparatus for a bicycle. More particularly, the present disclosure relates to a locking apparatus for locking a bicycle to a public bicycle station.

2. Description of Related Art

Recently, bicycle is means of transportation in the city. In addition to energetic promotion on riding bicycle, exclusive bicycle lanes have also been developed constantly by the government. However, a main problem for bicycle riders is safety parking of the bicycles. For solving this problem, it is necessary to set up exclusive parking spaces and safe-locking systems for the bicycles.

Public bicycle is one of the solutions of the problem. However, most of locking apparatus of the public bicycle station have complicated structures, thus the manufacturing cost thereof is high. In a conventional locking apparatus for bicycle, an inner portion has two rods installed through the left and the right side for obtaining locking or anti-parking effect. However, the number of the components of the conventional locking apparatus is large, and a larger force is required to driver the blocking member, thus it is strenuous to operate the locking apparatus, and the failure rate is high. Therefore, it is needed a locking apparatus having smooth operation and simple structure.

Moreover, for preventing the riders from adjusting themselves to a new operation practice, the locking apparatus must be able to be directly applied on the public bicycle station nowadays to meet requirements on easy management and repair. Thus it is difficult to manufacture a locking apparatus having all aforementioned conditions.

SUMMARY

According to one aspect of the present disclosure, a locking apparatus for a bicycle is provided. The locking apparatus is for locking with a public bicycle station and includes a body, a locking portion and a controlling portion. The body is connected to the bicycle. The locking portion is located on one side of the body and includes a rotating unit, a locking member and an ejecting member. The rotating unit includes a locking groove, wherein a locking head can be inserted into the locking groove, and the rotating unit is rotated between a first position and a second position. The locking member is connected on the rotating unit. The ejecting member is positioned on the locking portion, wherein when the rotating unit is located at the first position, the ejecting member is corresponded to the locking member and is ejected from the locking groove. The controlling portion is located on the other side of the body and includes an operating unit rotatably coupled to the rotating unit.

According to another aspect of the present disclosure, a locking apparatus for a bicycle is provided. The locking apparatus is for locking the bicycle to a public bicycle station. The locking apparatus includes a locking head, a body, a locking portion and a controlling portion. The locking head is connected to one end of a locking belt of the bicycle. The body is connected to the bicycle. The locking portion is located on one side of the body which is lockable to the public bicycle station. The locking portion includes a rotating unit, at least one locking member and at least one ejecting member. The rotating unit includes a locking groove, wherein the locking head is inserted into the locking groove, and the rotating unit is rotated between a first position and a second position. The locking member is connected on the rotating unit. The ejecting member is positioned on the locking portion, wherein when the rotating unit is located at the first position, the ejecting member is corresponded to the locking member and is ejected from the locking groove. The controlling portion is located on the other side of the body, and the controlling portion includes an operating unit rotatably coupled to the rotating unit.

BRIEF DESCRIPTION OF THE DRAWINGS

The present disclosure can be more fully understood by reading the following detailed description of the embodiment, with reference made to the accompanying drawings as follows.

DETAILED DESCRIPTION

Reference will now be made in detail to the present embodiments of the disclosure, examples of which are illustrated in the accompanying drawings. Wherever possible, the same reference numbers are used in the drawings and the description to refer to the same or like parts.

Figure 1:
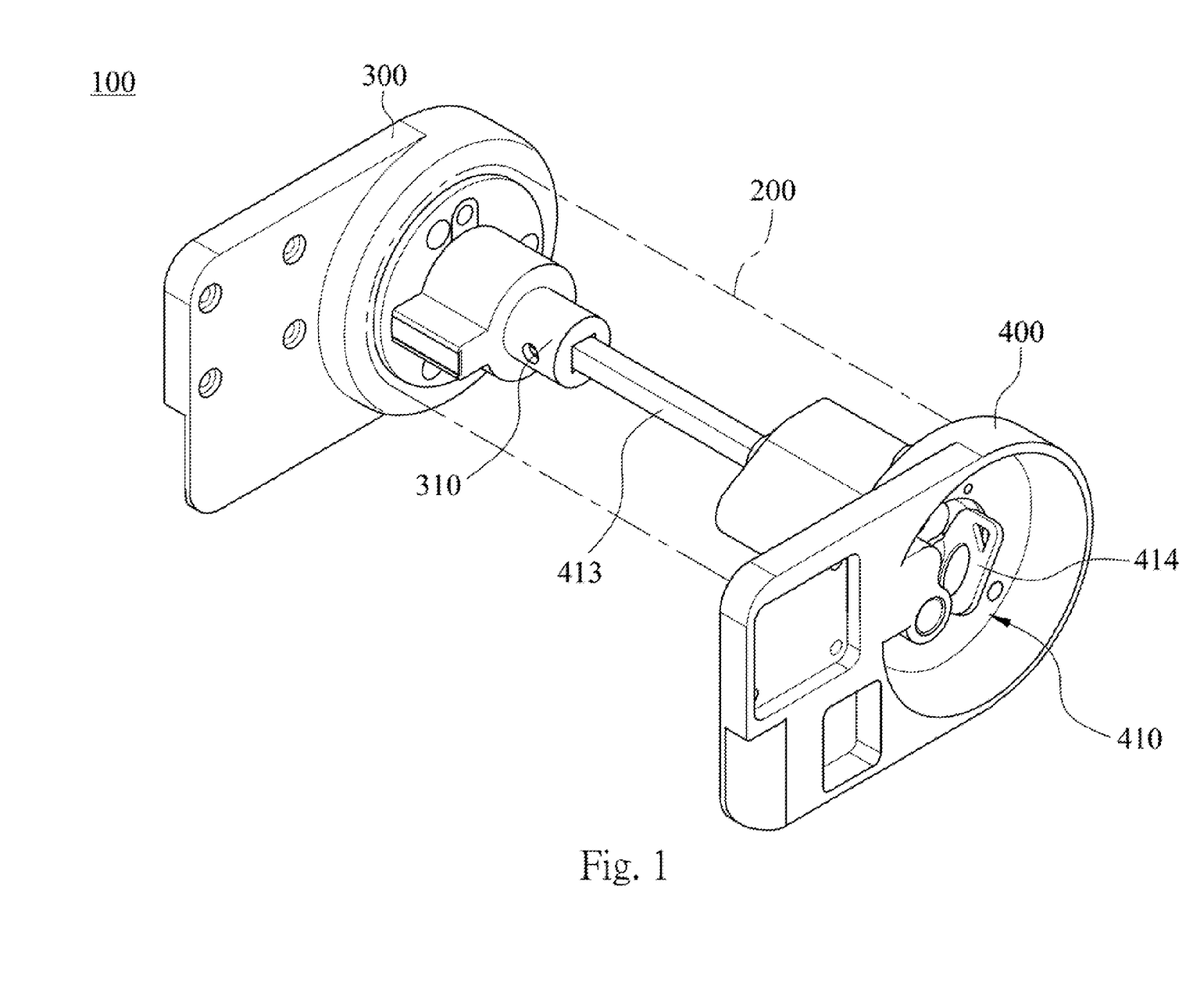
FIG. 1 is a partial perspective view showing a locking apparatus according to one embodiment of the present disclosure.
Figure 2:
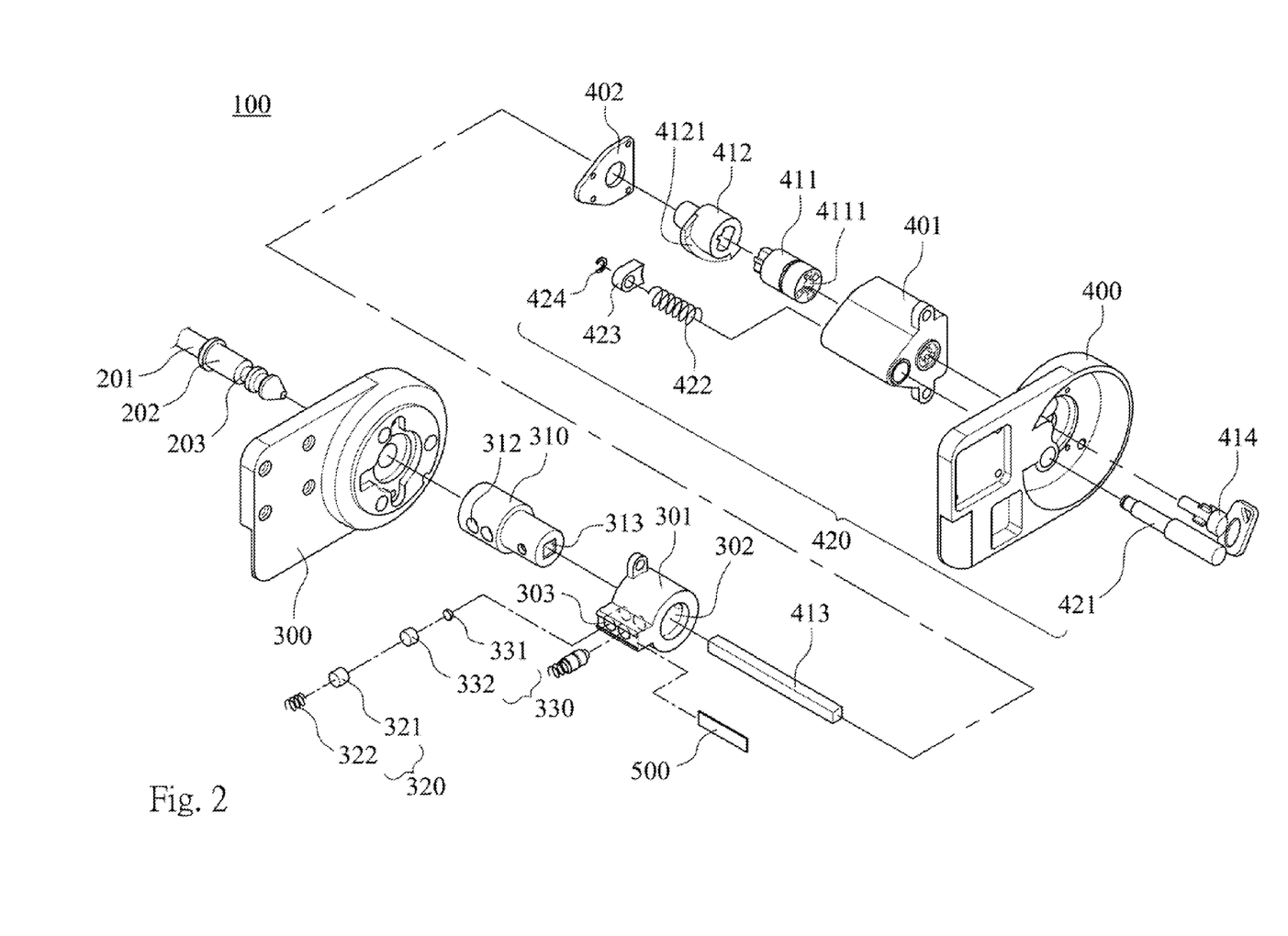
FIG. 2 is an exploded view showing the locking apparatus of FIG. 1.
Figure 3:
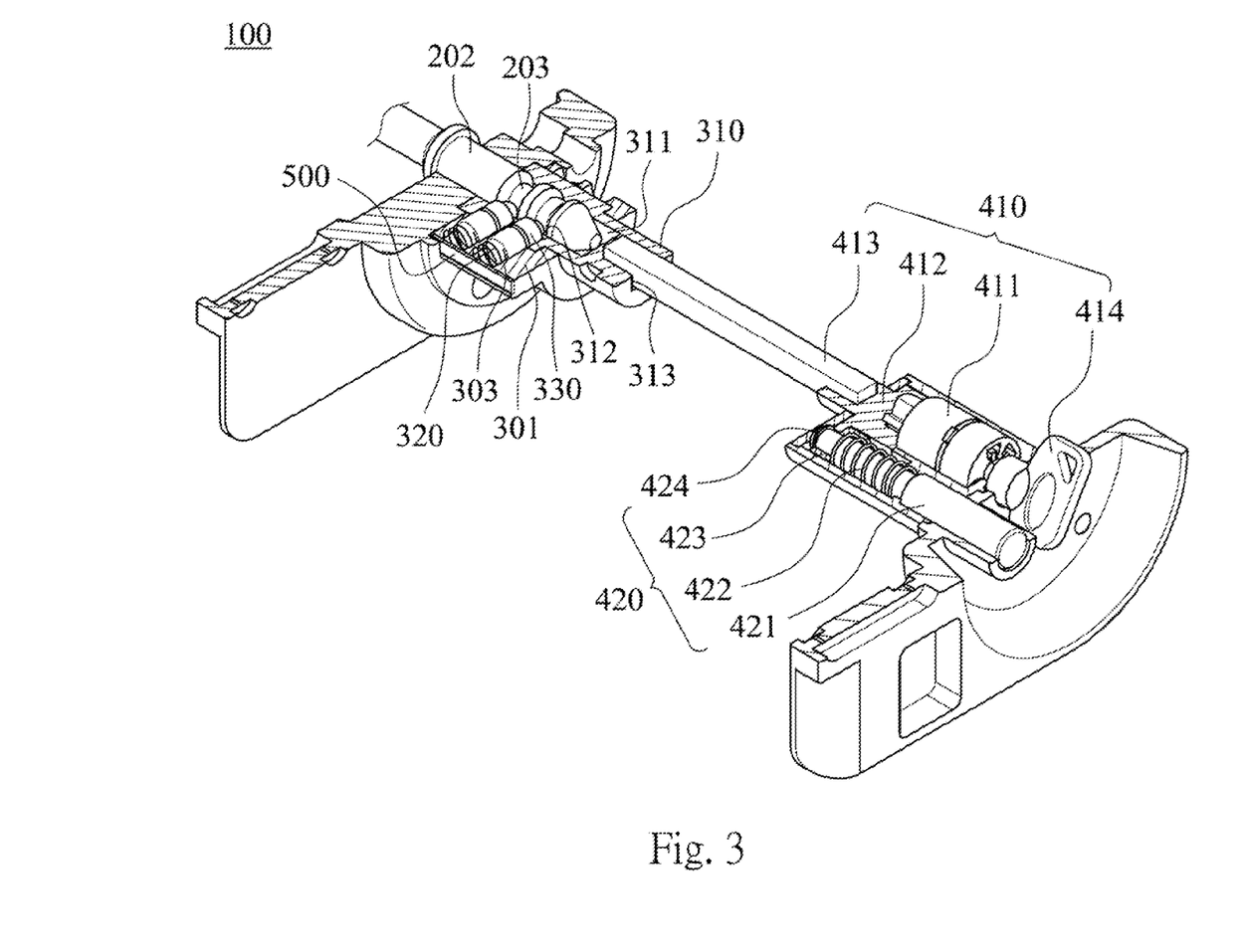
FIG. 3 is a sectional view showing the locking apparatus of FIG. 1.

FIG. 1 is a partial perspective view showing a locking apparatus 100 according to one embodiment of the present disclosure, FIG. 2 is an exploded view showing the locking apparatus 100 of FIG. 1, and FIG. 3 is a sectional view showing the locking apparatus 100 of FIG. 1.

A locking apparatus 100 for a bicycle is provided, when the bicycle is parked at a public bicycle station, the bicycle can be locked thereto via the locking apparatus 100. The locking apparatus 100 includes a body 200, a locking portion 300 and a controlling portion 400. A bicycle rider may lock or release the bicycle to or from the public bicycle station via the locking apparatus 100, and the bicycle can be avoided from stealing.

The body 200 is a hollow-shaped tube and is connected to the bicycle. The bicycle includes an extendable locking belt 201, and a locking head 202 is connected to one end of the locking belt 201.

The locking portion 300 is a rectangle-shaped plate and can be locked at the public bicycle station. The locking portion 300 is assembled in one side of the body 200. The locking portion 300 includes a base 301, a rotating unit 310, at least one ejecting members 320 and at least one locking members 330. The locking portion 300 includes a plurality of ejecting members 320 and a plurality of locking members 330 in this embodiment. The base 301 is assembled on the locking portion 300 and includes a hole 302 and two ejecting grooves 303 perpendicular to the hole 302. The rotating unit 310 is cylinder-shaped and can be rotatably assembled in the hole 302 of the base 301. The rotating unit 310 can be rotated between a first position and a second position. One end of the rotating unit 310 has a locking groove 311, so that the locking head 202 can be inserted into the locking groove 311, and the other end of the rotating unit 310 has a square groove 313. The rotating unit 310 further has a plurality of ejecting holes 312 perpendicular to the locking groove 311. The ejecting holes 312 are arranged from the locking groove 311 through the rotating unit 310. When the rotating unit 310 is located at the first position, the ejecting holes 312 are connected with the ejecting groove 303; when the rotating unit 310 is located at the second position, the ejecting holes 312 are not connected with the ejecting groove 303. Each of the locking members 330 includes a rounded end 331 and a locking pillar 332. Each rounded end 331 and each locking pillar 332 are positioned in each ejecting hole 312 in a group. The ejecting member 320 includes a stopping block 321 and a spring 322. The stopping block 321 and the spring 322 are limited in the ejecting groove 303 by a cover 500. When the ejecting hole 312 is connected with the ejecting groove 303, the locking member 330 is ejected along a radial ejecting path corresponded to the stopping block 321 and the spring 322, and the radial ejecting path allows the rounded head 331 of the locking member 330 to eject from the locking groove 311. Furthermore, the ejecting member 320 and the locking members 330 are arranged along an extended direction of the locking groove 311, and the locking head 202 has a plurality of dented annular grooves 203 corresponded to the locking members 330 for locking with the rounded head 331.

The controlling portion 400 is a rectangle-shaped plate and can be locked at the public bicycle station. The controlling portion 400 is assembled on the other side of the body 200. The controlling portion 400 includes a protrusion base 401 having a cover 402. The protrusion base 401 is for assembling an operating unit 410. The operating unit 410 includes, from outside to inside, a locking core 411 having a key hole 4111, a middle member 412 and a coupling member 413. The operating unit 410 can be rotated by inserting a key 414 into the key hole 4111 of the locking core 411. The locking core 411 rotates the coupling member 413 by the middle member 412. The coupling member 413 is assembled in the square groove 313 of the rotating unit 310. The rotating unit 310 can be coupled with the key through the controlling portion 400. A spiral ramp 4121 is assembled at outside of the middle member 412 of the controlling portion 400. The controlling portion 400 further includes a protruding member 420 positioned in the protrusion base 401. The protruding member 420 includes a bar 421, a spring 422, a protruding block 423 and a fastener 424. A recovering force is generated by the spring 422 and the protruding block 423. The protruding member 420 is protruded against the spiral ramp 4121. When the operating unit 410 is rotated, the bar 421 is protruded by the spiral ramp 4121 of the middle member 412, and when the operating unit 410 is reversely rotated, the bar 421 is drawn back with the spiral ramp 4121 by the recovering force.

In the present disclosure, when the rotating unit 310 is located at the first position, the ejecting hole 312 is connected with the ejecting groove 303; when the rotating unit 310 is located at the second position, the ejecting hole 312 is not connected with the ejecting groove 303. By this way, it is easy to allow the locking head 202 to be locked or released corresponding to the locking members 330. Therefore, the present disclosure has advantages on smooth operation, simple structure and low manufacturing cost. The locking portion 300 or the controlling portion 400 can also be easily locked at the public bicycle station. Therefore, the locking apparatus 100 is easy to use and meets demands of the market.

Figure 4:
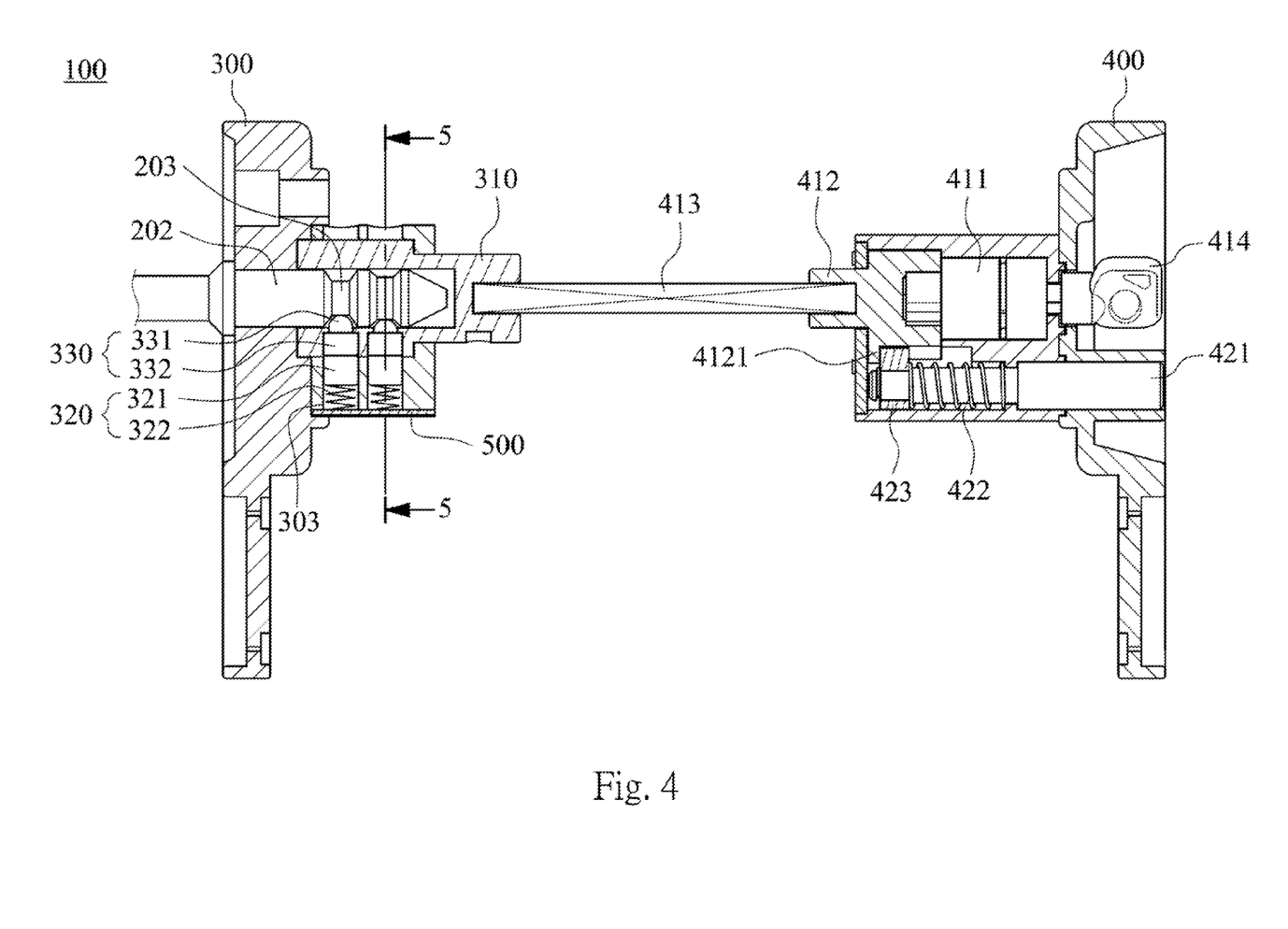
FIG. 4 is a sectional view showing an un-locking status when the rotating unit is located at the first position of the locking apparatus of FIG. 1.
Figure 5:
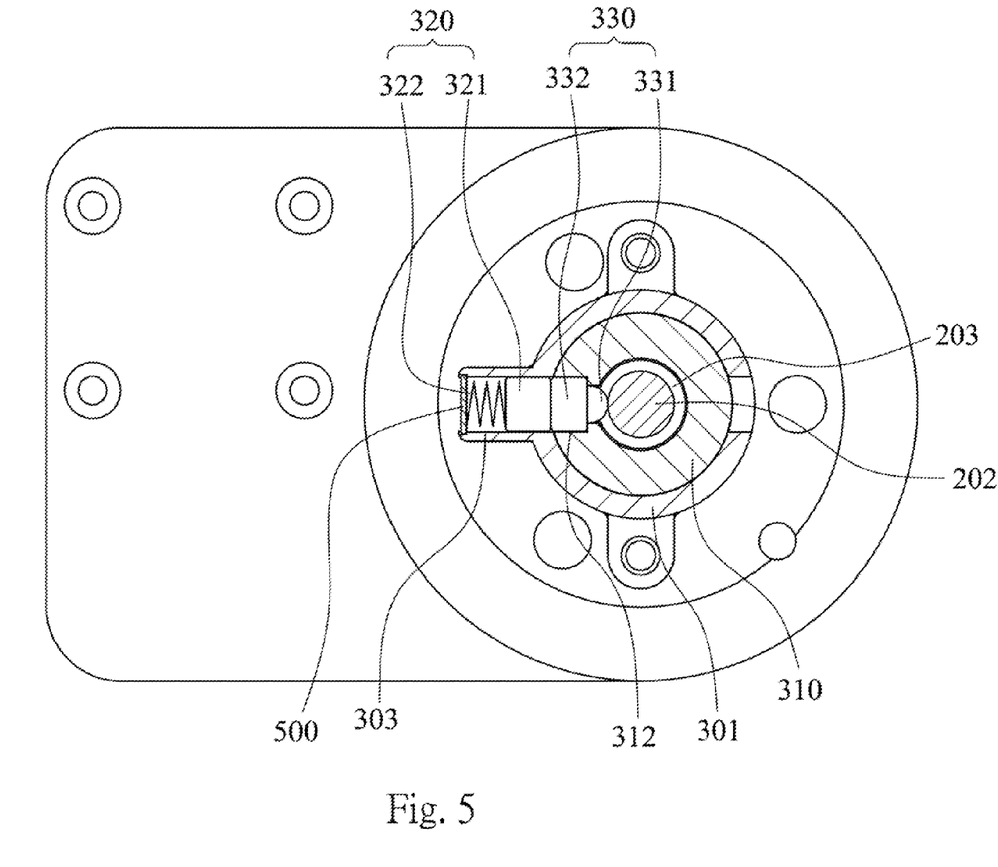
FIG. 5 is another sectional view showing the un-locking status when the rotating unit is located at the first position of the locking apparatus of FIG. 1.

FIG. 4 is a sectional view showing an un-locking status when the rotating unit 310 is located at the first position of the locking apparatus 100 of FIG. 1. FIG. 5 is another sectional view showing the un-locking status when the rotating unit 310 is located at the first position of the locking apparatus 100 of FIG. 1.

When the rotating unit 310 is located at the first position, the ejecting hole 312 is connected with the ejecting groove 303, thus a radial ejecting path is formed by the stopping block 321 and the spring 322. The ejecting path allows the rounded head 331 of the locking member 330 to eject from the locking groove 311. At the time, although each rounded head 331 is inserted into the dented annular groove 203, each rounded head 331 can be forced to eject from the locking groove 311 along the radial ejecting path. Therefore, the locking head 202 can be freely inserted or pulled out (un-locking status). The key 414 keeps the spiral ramp 4121 of the middle member 412 in a lowering position, thus the recovering force will make the bar 421 being drawn back along with the spiral ramp 4121.

Figure 6:
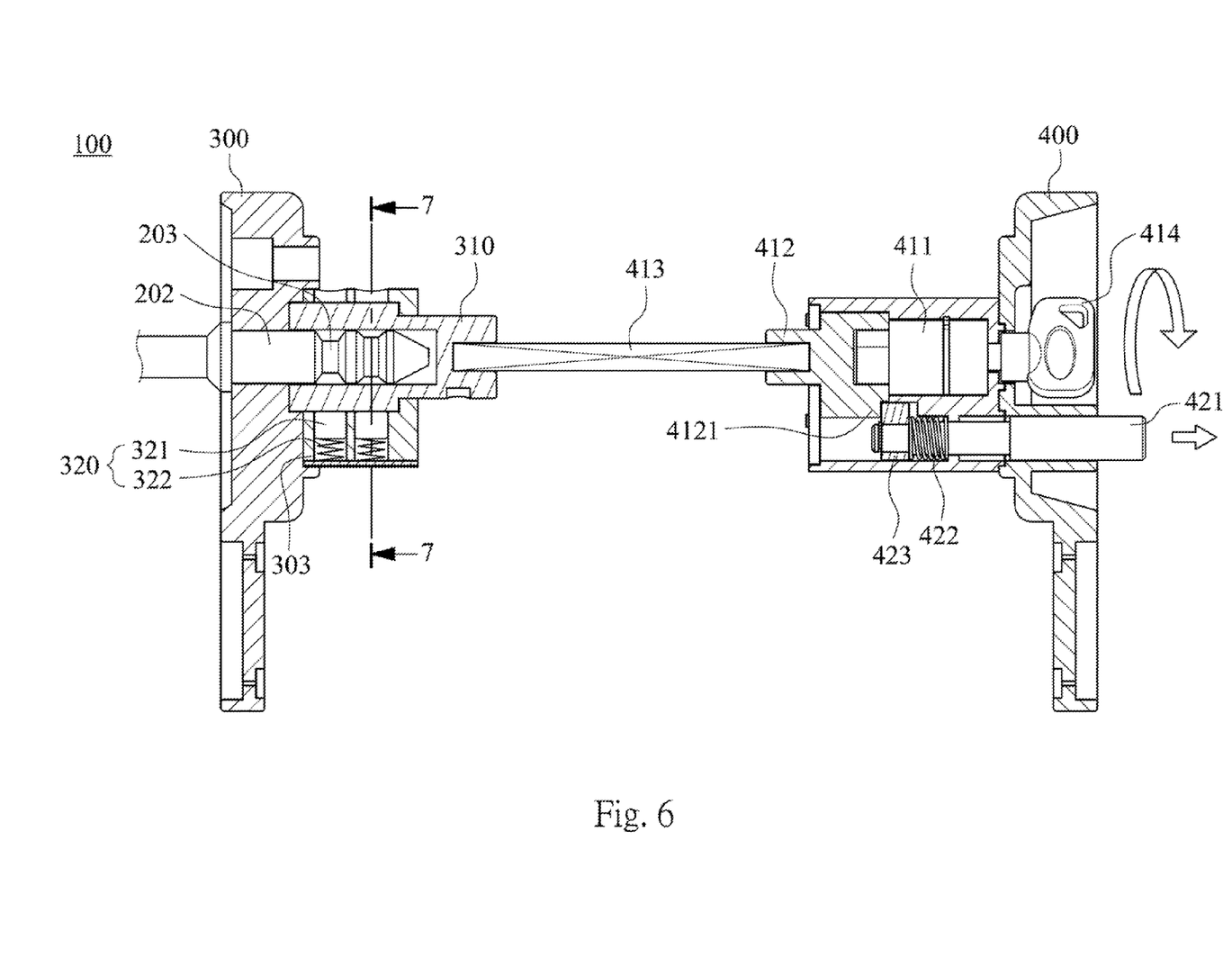
FIG. 6 is a sectional view showing a locking status when the rotating unit is located at the second position of the locking apparatus of FIG. 1.
Figure 7:
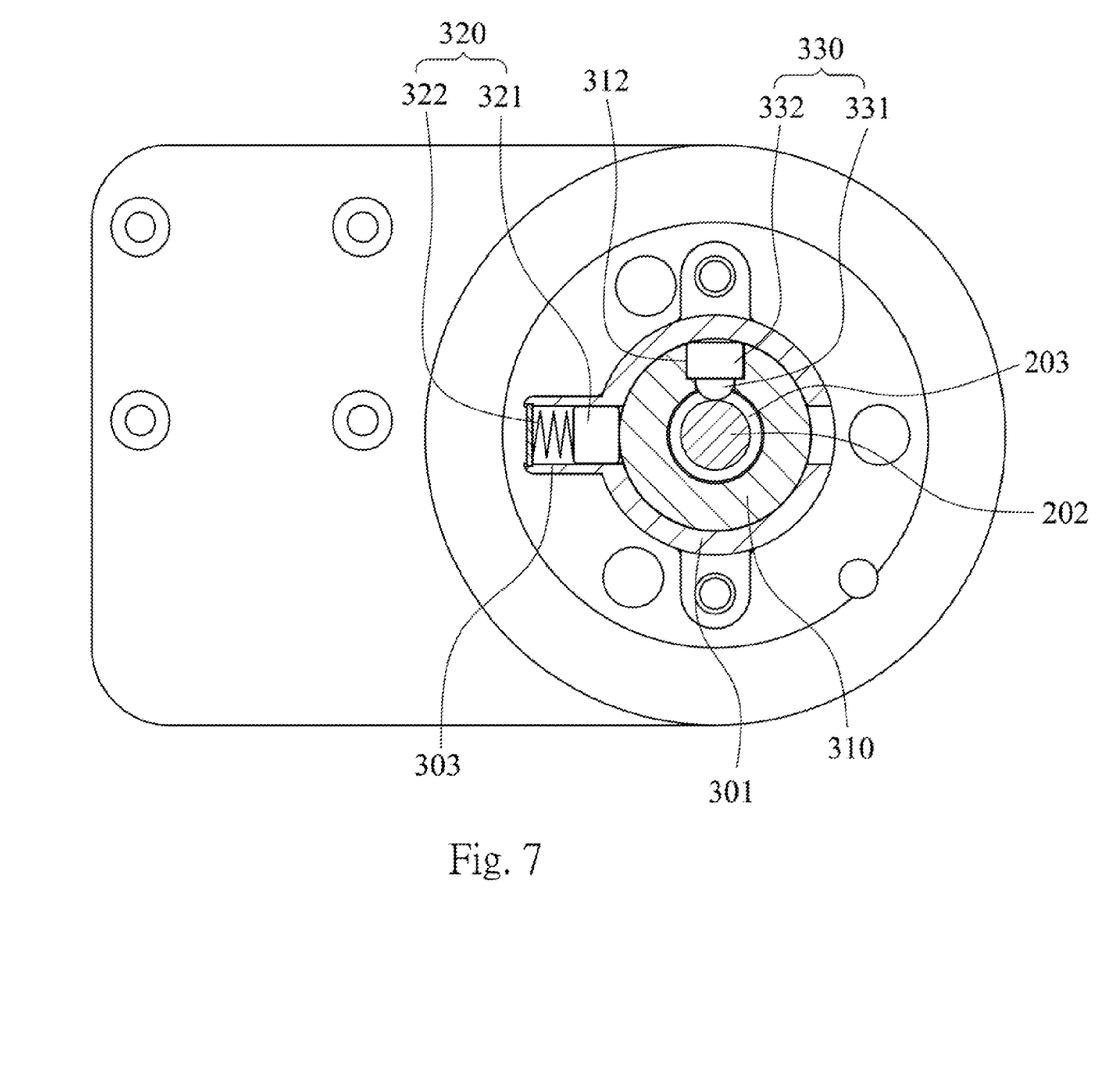
FIG. 7 is another sectional view showing the locking status when the rotating unit is located at the second position of the locking apparatus of FIG. 1.

FIG. 6 is a sectional view showing a locking status when the rotating unit 310 is located at the second position of the locking apparatus 100 of FIG. 1. FIG. 7 is another sectional view showing the locking status when the rotating unit 310 is located at the second position of the locking apparatus 100 of FIG. 1. When the rotating unit 310 is rotated by the key 414 and is located at the second position, the ejecting hole 312 is not connected with the ejecting groove 303. Therefore, the radial ejecting path for the locking member 330 is eliminated, thus the rounded head 331 of the locking member 330 is not allowed to eject from the locking groove 311. The dented annular groove 203 of the locking head 202 is embedded by the rounded head 331, and the locking head 202 cannot be pulled out (locking status). The key 414 rotates the spiral ramp 4121 of the middle member 412 to a raising position. Thus, when the operating unit 410 is rotated, the bar 421 is protruded by the spiral ramp 4121 of the middle member 412. The protruded bar 421 can prevent the locked bicycle from parking and informs that it is in a locking status.

In the aforementioned embodiment, the key 414 can rotate the operating unit 410, when the operating unit 410 rotates the rotating unit 310 to the second position, the key 414 can be released from the key hole 4111.

To sum up, the locking apparatus 100 of the present disclosure can be directly applied to the parking of the public bicycle nowadays, and has advantages on smooth operation, low failure rate and low manufacturing cost. Moreover, the locking apparatus 100 of the present disclosure can be used with any brands of bicycle. In other words, the locking apparatus 100 of the present disclosure is suitable for any kinds of bicycle body or equipment, thus the application field thereof is wide.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A locking apparatus for a bicycle, the locking apparatus for locking with a public bicycle station, the locking apparatus comprising:
   a body connected to the bicycle;
   a locking portion located on one side of the body, the locking portion comprising:
      a rotating unit comprising a locking groove, wherein a locking head can be inserted into the locking groove, and the rotating unit is rotated between a first position and a second position;
      a locking member connected on the rotating unit; and
      an ejecting member positioned on the locking portion, wherein when the rotating unit is located at the first position, the ejecting member is corresponded to the locking member and is ejected from the locking groove; and
   a controlling portion located on the other side of the body, the controlling portion comprising an operating unit rotatably coupled to the rotating unit.

2. The locking apparatus of claim 1, wherein the ejecting member comprises a stopping block and a spring, and the locking member is ejected from the locking groove along a radial ejecting path corresponding to the stopping block and the spring.

3. The locking apparatus of claim 1, wherein the controlling portion further comprises a protruding member telescopically linked up with the operating unit, when the rotating unit is rotated to the second position by the operating unit, the protruding member is protruded from the controlling portion.

4. The locking apparatus of claim 3, wherein the operating unit comprises a spiral ramp, the protruding member is withstood on the spiral ramp by a recovering force, and when the operating unit is swirled, the protruding member is protruded by the spiral ramp.

5. A locking apparatus for a bicycle, the locking apparatus for locking the bicycle to a public bicycle station, the locking apparatus comprising:
   a locking head connected to one end of a locking belt of the bicycle;
   a body connected to the bicycle
   a locking portion located on one side of the body, the locking portion comprising:
      a rotating unit comprising a locking groove, wherein the locking head can be inserted into the locking groove, and the rotating unit is rotated between a first position and a second position;
      at least one locking member connected on the rotating unit; and
      at least one ejecting member positioned on the locking portion, wherein when the rotating unit is located at the first position, the ejecting member is corresponded to the locking member and is ejected from the locking groove; and
   a controlling portion located on the other side of the body, the controlling portion comprising an operating unit rotatably coupled to the rotating unit;
   wherein the locking portion and the controlling portion are lockable to the public bicycle station, and the locking head is lockable with the locking portion.

6. The locking apparatus of claim 5, wherein the ejecting member comprises a stopping block and a spring, and the locking member is ejected from the locking groove along a radial ejecting path corresponding to the stopping block and the spring.

7. The locking apparatus of claim 5, wherein the controlling portion further comprises a protruding member telescopically linked up with the operating unit, when the rotating unit is rotated to the second position by the operating unit, the protruding member is protruded from the controlling portion.

8. The locking apparatus of claim 7, wherein the operating unit comprises a spiral ramp, the protruding member is withstood on the spiral ramp by a recovering force, and when the operating unit is swirled, the protruding member is protruded by the spiral ramp.

9. The locking apparatus of claim 5, wherein the locking portion comprises a plurality of ejecting members and a plurality of locking members, the locking members are arranged along an extending direction of the locking groove, and the locking head comprises a plurality of dented annular grooves corresponded to the locking members.

10. The locking apparatus of claim 5, wherein the controlling portion further comprises a key, an outer side of the operating unit comprises a key hole for inserting the key, the key is for rotating the operating unit, and when the rotating unit is rotated to the second position, the key can be separated from the key hole.

* * * * *